(12) United States Patent
Saffre et al.

(10) Patent No.: US 9,285,859 B2
(45) Date of Patent: Mar. 15, 2016

(54) METHOD AND SYSTEM FOR DETERMINING ALLOCATION OF CLIENTS TO SERVERS

(75) Inventors: Fabrice Saffre, Abu Dhabi (AE); Hanno Hlidmann, Abu Dhabi (AE); Sébastien Matthieu René Nicolas, Abu Dhabi (AE)

(73) Assignees: Khalifa University of Science, Technology, and Research British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 814 days.

(21) Appl. No.: 13/339,763

(22) Filed: Dec. 29, 2011

(65) Prior Publication Data

US 2013/0173802 A1  Jul. 4, 2013

(51) Int. Cl.
| | |
|---|---|
| *G06F 15/173* | (2006.01) |
| *G06F 1/32* | (2006.01) |
| *H04L 29/08* | (2006.01) |
| *H04L 12/12* | (2006.01) |
| *H04W 36/22* | (2009.01) |
| *H04W 52/02* | (2009.01) |

(52) U.S. Cl.
CPC ............ *G06F 1/3209* (2013.01); *H04L 12/12* (2013.01); *H04L 67/1008* (2013.01); *H04W 36/22* (2013.01); *H04W 52/0206* (2013.01); *Y02B 60/50* (2013.01)

(58) Field of Classification Search
CPC .................................................. H04L 67/1002
USPC ................................................ 709/225–226
See application file for complete search history.

(56) References Cited

U.S. PATENT DOCUMENTS

| | | | |
|---|---|---|---|
| 7,254,626 B1* | 8/2007 | Kommula | H04L 67/1008 709/217 |
| 2004/0268345 A1* | 12/2004 | Lodwick et al. | 717/176 |
| 2006/0168457 A1* | 7/2006 | Leech et al. | 713/300 |

(Continued)

OTHER PUBLICATIONS

Jean Louis Deneubourg. "Application de l'ordre par fluctuations a la description de certaines etapes de la construction de nid chez les termites", Insectes Sociaux, Paris, 1977, Tome 24, pp. 117-130.
GSM Association, "GSMA—European Mobile Manifesto". Nov. 2009.

(Continued)

*Primary Examiner* — Jason Recek
(74) *Attorney, Agent, or Firm* — Calfee Halter & Griswold, LLP (57) ABSTRACT

This invention relates to assignment of mobile clients (such as mobile telephones or software agents) to mainly stationary servers (such as mobile network base stations or computer servers) with the objective of reducing or minimizing the number of active servers. Once the number of users of a server drops below a specified level, the server may be deactivated resulting in power and efficiency savings. Preferably the method of the invention operates dynamically and during run time. In certain embodiments, the method can accept trade-offs in the quality of service or the number of active servers. In an embodiment of the invention, servers are arranged to "compete" with adjacent servers for their clients. This competition may be in a self-amplifying manner such that with the effect that more "popular" servers are more likely to succeed thus resulting in servers which are below a utilization threshold and can therefore be switched off.

26 Claims, 5 Drawing Sheets

(56) References Cited

U.S. PATENT DOCUMENTS

2008/0195719 A1* 8/2008 Wu .................. H04L 67/10
709/213
2013/0081101 A1* 3/2013 Baer .................. G06F 21/577
726/1

OTHER PUBLICATIONS

Gsm Association, "GSMA—Mobiles Green Manifesto". Nov. 2009.
Jie Gong, Sheng Zhou, Zhisheng Niu, and Peng Yang. "Traffic-aware base station sleeping in dense cellular networks". In 18th International Workshop on Quality of Service (IWQoS), pp. 1-2, Beijing, Jun. 2010. ISSN: 1548-615X, Print ISBN: 978-1-4244-5987-2.
Jyrki T. Louhi. "Energy efficiency of modern cellular base stations". In 29th International Telecommunications Energy Conference. INTELEC, pp. 475-476, 2007.
Marco Ajmone Marsan, Luca Chiaraviglio, Delia Ciullo, and Michela Meo. "Optimal Energy Savings in Cellular Access Networks". In IEEE International Conference on Communications Workshops, 2009. ICC Workshops 2009, pp. 1-5, Dresden, Jun. 2009. Print ISBN: 978-1-4244-3437-4.
Eunsung Oh and Bhaskar Krishnamachari. "Energy savings through dynamic base station switching in cellular wireless access networks". In IEEE Global Communications Conference. GLOBECOM, Florida, Dec. 2010.
M. Tahir Riaz, Jose M. Gutierrez, and Jens M. Pedersen. "Strategies for the next generation green ict infrastructure". In 2nd International Symposium on Applied Sciences in Biomedical and Communication Technologies. ISABEL, pp. 1-3, Bratislava, Nov. 2009. Print ISBN: 978-1-4244-4640-7.
Sheng Zhou, Jie Gong, Zexi Yang, Zhisheng Niu, and Peng Yang. "Green Mobile Access Network with Dynamic Base Station Energy Saving". In Mobicom 2009, Sep. 2009.

3GPP Technical Specification Group Services and System Aspects; Study on OAM aspects of Inter-RAT Energy Saving (Release 11) Dec. 12, 2011, pp. 1-26.
3GPP Technical Specification Group Radio Access Network; Evolved Universal Terrestrial Radio Access Netowkr (E-UTRAN); X2 application protocol (X2AP) (Release 10) Dec. 19, 2011, pp. 1-132.
Hildmann et al. "A Bio-Inspired Resource-Saving Approach to Dynamic Client-Server Association" IEEE Intelligent Systems vol. 27, No. 6, Nov. 1, 2012 pp. 17-25.
International Search Report dated Mar. 22, 2013, for related International Application No. PCT/GB2012/053079.
Written Opinion dated Mar. 22, 2013, for related International Application No. PCT/GB2012/053079.
Marta C. Gonzalez, Cesar A. Hidalgo, and Albert-Laszlo Barabasi. "Understanding individual human mobility patterns". Nature, 453(5):779-782, Jun. 5, 2008.
John E. Robson "Airline Deregulation—Twenty Years of success and counting", The Cato Organisation, Apr. 11, 1998 (online reference: http://www.cato.org/pubs/regulation/regv21n2/airline2-98.pdf).
Kappler et al. "Self-Management for Energy-Efficiency Adaptations in Access Networks", 2011 IEEE 16th International Workshop on Computer Aided Modelling and Design of Communication Links and Networks, Jun. 2011, pp. 71-76.
Gong et al. "A Novel Energy-Saving Algorithm Based on Sleeping Low-Loaded ONU for Hybrid Wireless-Optical Broadband Access Network", 2011 2nd International Conference on Networking and Information Technology, IPCSIT vol. 17, Nov. 2011, pp. 335-342.
Jyrki T. Louhi. "Energy efficiency of modern cellular base stations". In 29th International Telecommunications Energy Conference. INTELEC, pp. 475-476, Oct. 3, 2007.

* cited by examiner

Figure 7

METHOD AND SYSTEM FOR DETERMINING ALLOCATION OF CLIENTS TO SERVERS

FIELD OF THE INVENTION

The present invention relates to a method and system for determining allocation of clients to servers. It is particularly, but not exclusively, concerned with a method and system for the assignment of mobile clients to at least temporarily stationary servers such that the number of active servers can be reduced.

BACKGROUND OF THE INVENTION

Within information and communications technology (ICT) the majority of the power demand is generated by data centers, server farms, (wireless) telecommunication networks and the internet infrastructure [Marsan et al.].

Accordingly, there is a desire to implement operational methodologies which provide for power savings in such infrastructure.

For example, in a mobile telephone network (cellphone network) the mobile cell tower base-stations constitute a major part of the overall consumption of the whole network [Gong et al.] [Oh et al.].

Further, the rate of energy consumption and $CO_2$ emissions is doubling every 5 years [Riaz et al.]. Much of this increase is due to increased take-up of technological advances. Again, with respect to mobile telephones it is predicted ([GSMAa]) that the number of mobile connections is set to rise by 70% to 8 billion by 2020.

The mobile telecommunication industry has formed an association (GSMA) which has repeatedly stated its commitment to energy reduction and environmental friendly practices [GSMAa] [GSMAb]. Within this industry the overall CO2 emissions are already said to rival those of the aviation industry [Marsan et al.] [Zhou et al.], an industry which has in recent years been subject to many government imposed and environment oriented regulations and restrictions [Robson]. In order to avoid the need for such regulation in the future, power saving measures in the ICT field are clearly desirable.

SUMMARY OF THE INVENTION

An exemplary method of the present invention provides a method of allocating clients to a first server, the method including the steps of: a) determining, as between said first server and a second server, a contest which is weighted in favour of the server with the greater number of allocated clients; and b) if said first server is successful in said contest, changing the allocation of a client from said second server to said first server, and further including the step of: c) if the number of clients allocated to any server falls below a first threshold level, powering down said server.

A further exemplary aspect of the present invention provides a server for supplying a service to a plurality of clients, the system having a control unit, wherein said control unit is arranged to: manage the allocation of clients to said server by: a) determining, as between the server and a second server, a contest which is weighted in favour of the server with the greater number of allocated clients; b) if said server is successful in said contest, changing the allocation of a client from said second server to said server; c) following a contest with another server, determining the number of clients allocated to said server; and d) if said determined number of clients falls below a first threshold level, powering down said server.

An exemplary system of the present invention has a plurality of servers connected by a communications network, each of said servers supplying a service to one or more clients, and each of said servers having a control unit, wherein said control units are arranged to: manage the allocation of clients to the servers by: a) determining, as between a first and a second server, a contest which is weighted in favour of the server with the greater number of allocated clients; b) if said second server is successful in said contest, changing the allocation of a client from said first server to said second server; c) following a contest with another server, determining the number of clients allocated to each server; and d) if said determined number of clients falls below a first threshold level, powering down said server.

A further exemplary aspect of the present invention provides a mobile telecommunications system having: a plurality of base-stations for supplying a mobile telecommunications network to one or more mobile telephone handsets, each of said handsets being either allocated to one of said base-stations or being unallocated; and a communications network connecting said base-stations, wherein each of said base-stations has a control unit, said control units being arranged to manage the allocation of said mobile handsets to the base-stations by: a) identifying the potential for switching the allocation of a handset from a first base-station to a second base-station; b) determining, as between the first and second base-stations, a contest which is weighted in favour of the base-station with the greater number of allocated handsets; and c) if said second base-station is successful in said contest, changing the allocation of said handset from said first base-station to said second base-station; d) following a contest with another base-station, determining the number of handsets allocated to each base-station; and e) if said determined number of handsets falls below a first threshold level, disabling said base-station.

A further exemplary aspect of the present invention provides a computer network having: a plurality of client computers; a plurality of server computers for supplying services to one or more of said client computers, each of said client computers being either allocated to one of said server computers; and a communications network connecting said server computers and said client computers, wherein each of said server computers has a control unit, said control units being arranged to manage the allocation of said client computers to the server computers by: a) identifying the potential for switching the allocation of a client computer from a first server computers to a second server computer; b) determining, as between the first and second server computers, a contest which is weighted in favour of the server computer with the greater number of allocated client computers; and c) if said second server computer successful in said contest, changing the allocation of said client computer from said first server computer to said second server computer; d) following a contest with another server computer, determining the number of client computers allocated to each server computer; and e) if said determined number of client computers falls below a first threshold level, disabling said server computer.

BRIEF DESCRIPTION OF THE DRAWINGS

Embodiments of the invention will now be described by way of example with reference to the accompanying drawings in which.

DETAILED DESCRIPTION

Aspects of the present invention seek to provide methods and systems which handle the assignment of mobile clients (such as mobile telephones, PDAs, wireless computers, software agents, etc.) to at least temporarily stationary servers (such as base-stations, wireless access points, servers, providers, etc.) such that the number of active servers can be reduced or minimized.

The methods and systems of aspects of the present invention seek to handle such assignments dynamically and during run time, and may also allow trade-offs between factors such as quality of service or demand and operation efficiency.

It is also desirable that any such methods and systems are robust and versatile.

Preferably these objectives are achieved by methods and systems which implement a competition between servers which is biased towards decreasing the utilisation of servers with lower utilisation thereby potentially allowing such servers to be switched off Accordingly, at its broadest, a first aspect of the present invention provides a method of allocating clients to servers in which the allocation of those clients is determined by the outcome of contests between the servers.

A first aspect of the present invention preferably provides a method of allocating clients to a first server, the method including the steps of: a) determining, as between the first server and a second server, a contest which is weighted in favour of the server with the greater number of allocated clients; b) if said first server is successful in said contest, changing the allocation of a client from said second server to said first server, and c) if the number of clients allocated to any server falls below a first threshold level, powering down said server.

Accordingly, once the number of clients of a server drops below a specified level, the server may be disabled resulting in power and efficiency savings. Preferably the method of this aspect operates dynamically and during run time.

In certain embodiments, the clients are mobile clients which can move relative to the servers and so at a certain time may only be able to be served by one server, a selection of the total number of servers or none of the servers.

In certain embodiments, the method can accept trade-offs in the quality of service or the number of active servers. Preferably the contests between the servers may work in a self-amplifying manner such that with the effect that more "popular" servers are more likely to succeed thus resulting in servers which are below a utilization threshold and can therefore be powered down.

Generally the server consumes less power in a powered down state than it consumes in an powered up state. Accordingly, powering down the server when the number of clients falls below the first threshold level can allow power savings. This level may be set so as to provide a trade-off between power saving and service provision and may result in some clients not having an allocated server.

In certain embodiments, the powering down of a server may be achieved by disabling the server, designating the server as inactive, removing it from a duty roster, placing the server in a maintenance or standby mode, or similar operations. Powering down may include slowing down the processor (or disabling one or more processors or processor cores in a multi-processor server), powering down a transceiver or other communications unit, stopping operation of hard disk drives or other storage components or similar operations which reduce the overall power consumption of the server whilst preferably retaining some operational capability.

By implementing a method of this aspect, it may be possible to provide for the more efficient use of infrastructure and as such minimize the cost of both the operational upkeep as well as the overall running cost of the system by reducing the idle time (e.g. the time when the server is powered, but not serving any clients, or only a very small number of clients) of individual servers. The cost for operational upkeep may be reduced both for the maintenance and replacement of parts of the infrastructure (resulting in extended lifetime of equipment) as well as through the redistribution and re-use of resources.

Preferably the method of this aspect is implemented in a situation in which satisfying the demands of a plurality of clients is more efficient with fewer servers than with a larger number of servers. This is often the case due to operational overheads in the servers. In such situations, the "cost" (whether in running costs, power consumption, maintenance requirements or other factors) of operation one server at 100% capacity is cheaper than operating n servers at 1/n capacity.

Furthermore implementation of a method of this aspect may allow reduction of the impact on the environment of the client-server system and thus facilitate a cost effective solution to the problem of having to adhere to government enforced environmental regulations.

The first threshold may be uniform across all servers in a network, or may be set separately for each server (depending, for example, on the technical capabilities of the server, or the location of the server—e.g. servers in rural or remote locations may have a lower threshold in order to ensure service levels are maintained in those areas).

The first threshold may also be constant, or may vary with time, for example keeping the server enabled at certain times when it is know that levels of demand will be lower, in order to ensure service quality. Alternatively or additionally the first threshold may be dynamically adapted depending on conditions on the first server or in the wider network.

Preferably the method further includes the step of, prior to said step of determining, identifying the potential for switching the allocation of a client from said second server to said first server. This may reduce the number of contests carried out as contests are only carried out where the potential for a switch in allocation exists.

In some embodiments said step of identifying includes the sub-steps of: identifying said second server as a neighbouring server which may have a client which could be allocated to said first server; and determining whether said second server currently has any allocated clients which could be allocated to said first server.

In other embodiments said step of identifying includes the sub-step of: identifying a client which is able to be allocated to said first server, but is currently allocated to said second server.

Thus the identification of target clients for re-allocation may be done on a server basis or on a client basis.

Preferably the method further includes the steps of: d) determining whether the number of clients allocated to the first server is at or above a second threshold level; and e) if said number of clients is below said level, performing steps a) to c) above. More preferably if said number of clients is at or above said level, the method re-performs steps d) and e) after a predetermined time interval.

Accordingly, if the first server reaches a certain level of capacity (the second threshold level), it no longer competes for clients with neighbouring servers. This may prevent a server from becoming overloaded following success in a number of contests and therefore resulting in a reduced level of performance for the clients. The server can periodically monitor whether this capacity has still been reached or whether the number of clients has dropped back below that threshold (for example by clients switching off or moving out of range of the server).

As with the first threshold, the second threshold may be uniform across all servers, or may be set separately for each server (depending, for example, on the technical capabilities of the server, or the location of the server). Furthermore the second threshold may be constant for a particular server, or may vary with time, for example allowing greater capacity at certain times to cope with predicted levels of demand. Alternatively or additionally the second threshold may be dynamically adapted depending on conditions on the server or in the wider network.

The method preferably further includes the steps of, for a powered down server: checking whether the number of unallocated clients within range of said server is at or above said first threshold level; and if said number is at or above said first threshold level, powering up said server and allocating said unallocated clients to said server.

The number of clients which are able to be served by a server may change over time, for example, as a result of clients turning on or moving to a location where they can be served by the server. Furthermore, within a network of servers operating as described in this aspect, a neighbouring server may be powered down because the number of clients allocated to it falls below a threshold. This may result in one or more clients which were previously allocated to that server no longer being served by any server.

Thus a server which detects that there are a certain number of clients which it could provide services to, and which are not currently allocated to a server, it may be powered up in order to ensure service to those clients. Accordingly, a powered down server preferably checks on a periodic basis whether it should re-enable in order to ensure a certain level of service provision.

The determination of the contest between the two servers may be based on a formula which makes the probability of a server being successful dependent on the number of clients allocated to that server compared to the number of clients allocated to the other server.

The formula which is used to determine the contest may be tuned or tunable in order to adjust the preferred steady state situation and/or to adjust the rate of swapping of clients between servers.

One particular formula that can be used to determine the contest is:

$$P_A = \frac{(k + x_A)^\alpha}{(k + x_A)^\alpha + (k + x_S)^\alpha}$$

where $P_A$ is the probability of server A winning the contest, $x_S$ is the number of clients affiliated to station S, and k and $\alpha$ are tunable parameters.

The method of this aspect may be applied in a number of arrangements. For example in some embodiments the servers may be mobile telephone network base-stations and the clients mobile telephone handsets. In other embodiments the servers are computer servers and the clients are client computers running programs which interact with said servers.

Embodiments of this first aspect may include some, all or none of the above described optional or preferred features.

At its broadest, a second aspect of the present invention provides a server which is able to manage the allocation of clients to the server by competing for the allocation of those clients with other servers.

Accordingly a second aspect of the present invention preferably provides a server for supplying a service to a plurality of mobile clients, the system having a control unit, wherein said control unit is arranged to: manage the allocation of mobile clients to said server by: a) determining, as between the server and a second server, a contest which is weighted in favour of the server with the greater number of allocated clients; b) if said server is successful in said contest, changing the allocation of a client from said second server to said server; c) following a contest with another server, determining the number of clients allocated to said server; and d) if said determined number of clients falls below a first threshold level, powering down said server.

Accordingly, once the number of clients of a server drops below a specified level, the server may be powered down resulting in power and efficiency savings. Preferably the server of this aspect operates the above processing dynamically and during run time.

In certain embodiments, the server can accept trade-offs in the quality of service or the number of active servers. Preferably the contests between the servers may work in a self-amplifying manner such that with the effect that more "popular" servers are more likely to succeed thus resulting in servers which are below a utilization threshold and can therefore be powered down.

In certain embodiments, the clients are mobile clients which can move relative to the servers and so at a certain time may only be able to be served by one server, a selection of the total number of servers or none of the servers.

Generally the server consumes less power in a powered down state than it consumes in an powered up state. Accordingly, powering down the server when the number of clients falls below the first threshold level can allow power savings. This level may be set so as to provide a trade-off between power saving and service provision and may result in some clients not having an allocated server.

In certain embodiments, the powering down of a server may be achieved by disabling the server, designating the server as inactive, removing it from a duty roster, placing the server in a maintenance or standby mode, or similar operations. Powering down may include slowing down the processor (or disabling one or more processors or processor cores in a multi-processor server), powering down a transceiver or other communications unit, stopping operation of hard disk drives or other storage components or similar operations which reduce the overall power consumption of the server whilst preferably retaining some operational capability.

By providing a server according to this aspect, it may be possible to provide for the more efficient use of infrastructure and as such minimize the cost of both the operational upkeep as well as the overall running cost of the system by reducing the idle time (e.g. the time when the server is powered, but not serving any clients, or only a very small number of clients) of individual servers. The cost for operational upkeep may be reduced both for the maintenance and replacement of parts of the infrastructure (resulting in extended lifetime of equipment) as well as through the redistribution and re-use of resources.

Furthermore provision of a server according to this aspect (either alone, or preferably in combination with a plurality of such servers) may allow reduction of the impact on the environment of the client-server system and thus facilitate a cost effective solution to the problem of having to adhere to government enforced environmental regulations.

The first threshold may be uniform across all servers in a network, or may be set separately for each server (depending, for example, on the technical capabilities of the server, or the location of the server—e.g. servers in rural or remote locations may have a lower threshold in order to ensure service levels are maintained in those areas).

The first threshold may also be constant, or may vary with time, for example keeping the server enabled at certain times when it is know that levels of demand will be lower, in order to ensure service quality. Alternatively or additionally the first threshold may be dynamically adapted depending on conditions on the first server or in the wider network.

Preferably the control unit is further arranged to manage the allocation of clients by identifying the potential for switching the allocation of a client from said second server to said server. This may reduce the number of contests carried out as contests are only carried out where the potential for a switch in allocation exists.

In certain embodiments the control unit is arranged to identify said potential by: identifying said second server as a neighbouring server which may have a client which could be allocated to said first server; and determining whether said second server currently has any allocated clients which could be allocated to said first server.

In other embodiments the control unit is arranged to identify said potential by: identifying a client which is able to be allocated to said first server, but is currently allocated to said second server.

Thus the identification of target clients for re-allocation may be done on a server basis or on a client basis.

Preferably the server periodically broadcasts, to one or more neighbouring servers, a list of the clients which are currently allocated to the server.

This allows other servers to know what clients are allocated to neighbouring servers and so when a contest may be initiated to attempt to transfer a particular client. This broadcasting may be by means of point to point messages sent from a server to other servers, but is preferably by means of a multicast message from a server to a number of other servers. Using a multicast message reduces the number of messages being sent and the overheads associated with managing the transmittal of such messages.

In order to reduce the number of messages on the network and the amount of information stored by each server, the servers preferably only maintain information about other neighbouring servers (i.e. those who might have a client which is a potential client of that server). Low level networking schemes can thus be implemented to prevent packet flooding. For example, standard UDP multicast mechanisms may be used whereby the packets are sent only once on a local network and the network elements of the server pick up the packets as they arrive. Preferably the network operates so that there is no retransmission of lost packets (as in TCP) and thus no flooding.

Preferably the control unit is further arranged to: determine whether the number of clients allocated to the first server is at or above a second threshold level; and if said number of clients is below said level, perform steps a) to c) above.

Accordingly, if the server reaches a certain level of capacity (the second threshold level), it no longer competes for clients with neighbouring servers. This may prevent a server from becoming overloaded following success in a number of contests and therefore resulting in a reduced level of performance for the clients. The server can periodically monitor whether this capacity has still been reached or whether the number of clients has dropped back below that threshold (for example by clients switching off or moving out of range of the server).

As with the first threshold, the second threshold may be uniform across all servers, or may be set separately for each server (depending, for example, on the technical capabilities of the server, or the location of the server). Furthermore the second threshold may be constant for a particular server, or may vary with time, for example allowing greater capacity at certain times to cope with predicted levels of demand. Alternatively or additionally the second threshold may be dynamically adapted depending on conditions on the server or in the wider network.

Preferably the control unit is further arranged to, if the server is currently powered down: check whether the number of unallocated clients within range of said server is at or above said first threshold level; and if said number is at or above said first threshold level, power up said server and allocate said unallocated clients to said server.

The number of clients which are able to be served by a server may change over time, for example, as a result of clients turning on or moving to a location where they can be served by the server. Furthermore, within a network of servers operating as described in this aspect, a neighbouring server may be powered down because the number of clients allocated to it falls below a threshold. This may result in one or more clients which were previously allocated to that server no longer being served by any server.

Thus a server which detects that there are a certain number of clients which it could provide services to, and which are not currently allocated to a server, it may be powered up in order to ensure service to those clients. Accordingly, a powered down server preferably checks on a period basis whether it should re-enable in order to ensure a certain level of service provision.

The determination of the contest between the two servers may be based on a formula which makes the probability of a server being successful dependent on the number of clients allocated to that server compared to the number of clients allocated to the other server.

The formula which is used to determine the contest may be tuned or tunable in order to adjust the preferred steady state situation and/or to adjust the rate of swapping of clients between servers.

One particular formula that can be used to determine the contest is:

$$P_A = \frac{(k+x_A)^\alpha}{(k+x_A)^\alpha + (k+x_S)^\alpha}$$

where $P_A$ is the probability of server A winning the contest, $x_S$ is the number of clients affiliated to station S, and k and $\alpha$ are tunable parameters.

Embodiments of this second aspect may include some, all or none of the above described optional or preferred features.

Embodiments of this second aspect preferably operate by carrying out a method according to the above first aspect, which may include some, all or none of the above described optional or preferred features of that aspect.

A third aspect of the present invention provides a system having a plurality of servers connected by a communications network, each of said servers supplying a service to one or more clients, and each of said servers having a control unit, wherein said control units are arranged to: manage the allocation of clients to the servers by: a) determining, as between a first server and a second server, a contest which is weighted in favour of the server with the greater number of allocated clients; b) if said second server is successful in said contest, changing the allocation of a client from said first server to said second server; c) following a contest with another server, determining the number of clients allocated to each server; and d) if said determined number of clients falls below a first threshold level, powering down said server.

The control units may be further arranged to identify the potential for switching the allocation of a client from a first server to a second server.

Within the system of this aspect, the various operations in the re-allocation of clients between servers are preferably distributed between the control units of the two servers involved. In particular, in certain embodiments said step a) of identifying is performed by the control unit of the second server; and said step b) of determining is performed by the control unit of the first server.

Preferably said servers periodically broadcast, to one or more neighbouring servers, a list of the clients which are currently allocated to the server. This allows other servers to know what clients are allocated to neighbouring servers and so when a contest may be initiated to attempt to transfer a particular client. This broadcasting may be by means of point to point messages sent from a server to other servers, but is preferably by means of a multicast message from a server to a number of other servers. Using a multicast message reduces the number of messages being sent and the overheads associated with managing the transmittal of such messages.

In order to reduce the number of messages on the network and the amount of information stored by each server, the servers preferably only maintain information about other neighbouring servers (i.e. those who might have a client which is a potential client of that server). Low level networking schemes can thus be implemented to prevent packet flooding.

For example, standard UDP multicast mechanisms may be used whereby the packets are sent only once on a local network and the network elements of the server pick up the packets as they arrive. Preferably the network operates so that there is no retransmission of lost packets (as in TCP) and thus no flooding.

The system of this aspect may further include one or more of said clients. Typically there will be significantly greater numbers of clients than there are servers.

A server, or all servers, of this third aspect may further include some, all or none of the above described optional or preferred features of the server of the above second aspect.

A fourth aspect of the present invention provides a mobile telecommunications system having: a plurality of base-stations for supplying a mobile telecommunications network to one or more mobile telephone handsets, each of said handsets being either allocated to one of said base-stations or being unallocated; and a communications network connecting said base-stations, wherein each of said base-stations has a control unit, said control units being arranged to manage the allocation of said mobile handsets to the base-stations by: a) identifying the potential for switching the allocation of a handset from a first base-station to a second base-station; b) determining, as between the first and second base-stations, a contest which is weighted in favour of the base-station with the greater number of allocated handsets; and c) if said second base-station is successful in said contest, changing the allocation of said handset from said first base-station to said second base-station; d) following a contest with another base-station, determining the number of handsets allocated to each base-station; and e) if said determined number of handsets falls below a first threshold level, disabling said base-station.

A fifth aspect of the present invention provides a computer network having: a plurality of client computers; a plurality of server computers for supplying services to one or more of said client computers, each of said client computers being either allocated to one of said server computers; and a communications network connecting said server computers and said client computers, wherein each of said server computers has a control unit, said control units being arranged to manage the allocation of said client computers to the server computers by: a) identifying the potential for switching the allocation of a client computer from a first server computers to a second server computer; b) determining, as between the first and second server computers, a contest which is weighted in favour of the server computer with the greater number of allocated client computers; and c) if said second server computer successful in said contest, changing the allocation of said client computer from said first server computer to said second server computer; d) following a contest with another server computer, determining the number of client computers allocated to each server computer; and e) if said determined number of client computers falls below a first threshold level, disabling said server computer.

The present invention can be applied to a variety of optimization problems (in particular runtime optimization problems) in which the aggregation of processes/clients on a limited number of resources/servers benefits overall efficiency.

Specific embodiments which relate to the mapping of mobile terminals (nodes) onto a sub-set of available base stations are set out below as an illustrative example, but the skilled person will appreciate that the methods and systems described can be readily adapted to other implementations. Without limitation, such implementations include the allocation of client processes to servers providing resources for those processes and the allocation of resources in a logistics system.

In general terms, a mobile telephone (cellphone) network is a wireless access network which can be viewed as a set of many base-stations (access points) with overlapping coverage. In the absence of competition between base-stations, mobile terminals will simply affiliate themselves to the base-station with the strongest signal, i.e., in first approximation (i.e. notwithstanding radio shadows and other perturbations), the nearest one.

If there are enough mobile nodes (i.e. significantly more than there are base-stations, as is typical in use) and their spatial distribution is random, this approach effectively means that all access points will statistically have at least a few terminals affiliated to them, and therefore that all of those base-stations have to be powered on in order to ensure 100% coverage. This approach therefore ignores the possibility that some mobile nodes may also be within range of a more distant base-station.

Therefore such an approach leads to an inefficient configuration, at least as long as the access network has enough spare capacity to require only a sub-set of all base-stations to satisfy the demand in a mean-field approximation (i.e. not taking into account the relative location of mobile terminals and access points).

The optimization strategy of the present embodiment involves creating a competition between base-stations, using a "rich becomes richer" algorithm to break symmetry and ensure that a clear "winner" emerges from the interaction. This is done by transferring mobile terminals from one access point to another, the direction of the "move" being determined by the outcome of a nonlinear "contest", possible implementations of which are set out below.

Such a process is self-amplifying, leading to some access points gradually losing their affiliates to more "popular" base-stations. Obviously, some refinements are required to accurately reflect the specific constraints of this embodiment:
a) Only base-stations with overlapping cells are allowed to compete with each other (otherwise there would be no mobile terminals that can be transferred whilst maintaining connection, and so the competition would be meaningless).
b) Only mobile terminals that are within range of the "winner" can be transferred (again, if other terminals were transferred, they would become disconnected; however transfer of even one terminal away from a particular base-station may affect the "competition" with another neighbouring base-station).
c) Only access points with spare capacity/bandwidth are allowed to compete (so that, once the terminals are transferred, the "winning" base-station is able to service them).

At its simplest, the objective of this competition between base-stations is that at least one base-station S ends up with no affiliates ($x_S=0$) and therefore can be switched off, resulting in savings in both power consumption and maintenance without affecting coverage.

This approach can be refined by tuning base-station behaviour so as to take into account further possible situations.

For example, a base-station that has only a small number of affiliates, i.e. is below a predetermined level (either in an absolute sense, or compared to its neighbours) can be allowed to switch off even if those affiliates are unable to transfer to a neighbouring base-station. This is a trade-off between efficiency and coverage.

Alternatively or additionally, an access point that has been switched off can be programmed to periodically "wake-up" and passively listen for "orphaned" terminals within its communication range. If the number of these exceeds a predetermined target (absolute or relative to the number of mobile nodes in its immediate neighbourhood), the base-station is switched on again to increase coverage. As such the base-station can react to density and distribution changes over time.

Other rules can be applied, in particular in order to maintain quality of service. For example, transfer of a mobile terminal may be prevented if it is in the process of sending or receiving traffic (as opposed to simply registering its presence with a basic "heartbeat" signal).

A specific example of protocols that may be applied on a base station level to implement the present invention will now be described. In this embodiment no modification is required to the mobile terminals themselves. This is advantageous as it means that roll-out of this technology can be achieved by updating software (or possibly hardware) on a much smaller number of base-stations, all of which are likely to be in the control of the service provider and therefore available for modification. Although embodiments are possible in which modification of mobile terminals are made (or required), these are less preferred because they require modification of a far greater number of devices and may require the cooperation of the users/owners of the mobile terminals.

Figure 1:
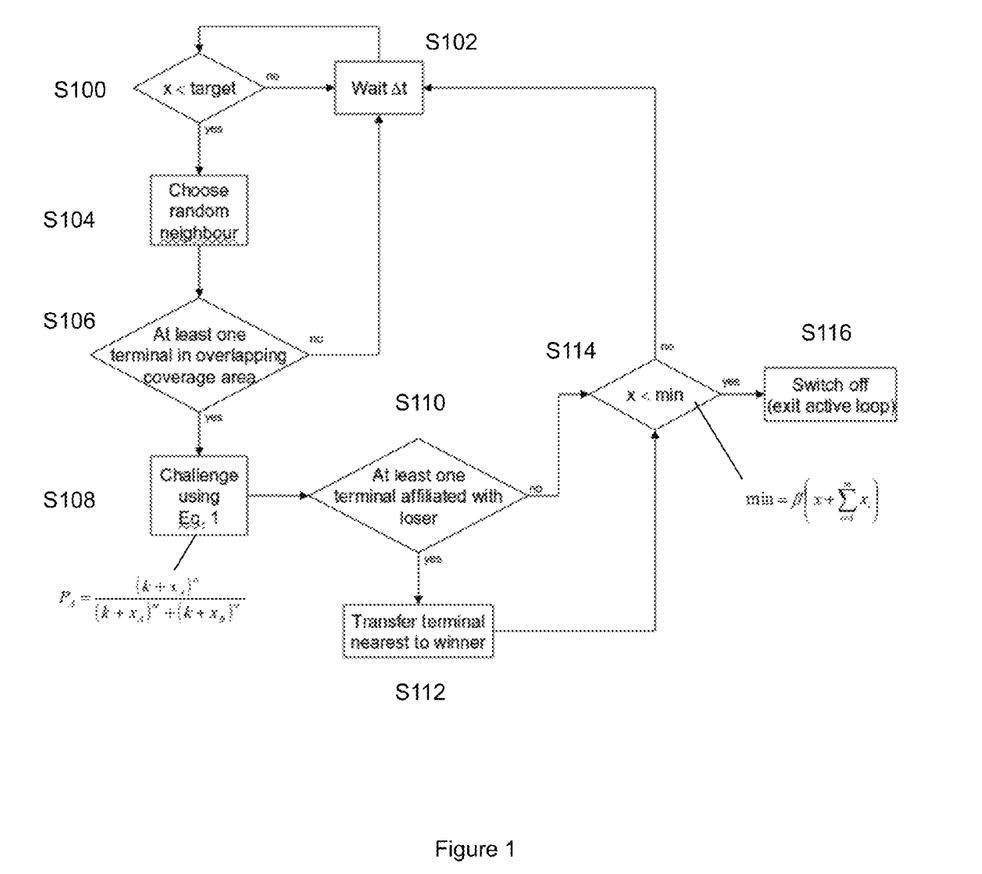
FIG. 1 shows, in schematic form, a method of operating a wireless base-station according to a first embodiment of the present invention.

The process followed by base-stations in this embodiment is set out in FIG. 1 and is a closed loop process which is preferably continuously implemented while the base-station is operational.

Each base-station is assigned a target of a certain number of affiliates. This target is generally identical for all base-stations, but may also be specifically assigned (for example base-stations in rural areas may be assigned a lower target than base-stations in urban areas). The target may also be dynamic, for example changing over the course of a 24 hour period.

The steady-state situation is a loop in the upper left-hand corner of FIG. 1 in which the base-station has at least its target number of affiliates. This situation is checked on a regular basis (steps S100, S102).

When the target is not met (S100), the base-station selects a randomly chosen base station neighbour (S104). "Neighbour" base-stations are defined by an interaction network between all base stations. The "neighbour" base-stations for a given base-station will normally only be a subset of the complete graph defined by distance only, due to constraints (spectrum allocation, directionality, etc). However, provided that there is overlap in the areas of coverage, then the "challenge" process is worthwhile and the base-stations are considered "neighbouring" even if there is an intermediate base-station which is, in distance terms, closer to the base-station in question.

If there is at least one mobile terminal currently within overlapping range of both base stations (S106), the base-stations carry out a contest (S108) using the following equation:

$$P_A = \frac{(k+x_A)^\alpha}{(k+x_A)^\alpha + (k+x_S)^\alpha}$$

where $P_A$ is the probability of station A winning the contest, $x_S$ is the number of mobile terminals affiliated to station S, and $k$ and $\alpha$ are tuneable parameters.

If the contest is won and there is still a common mobile terminal between the stations (S110—this step allows for the fact that mobile terminals may have moved whilst the contest is being conducted), it is transferred to the winning station (S112).

If this transfer results in the losing station having less than a set number of affiliates "min" (S114), it switches itself off (S116). The threshold (min) in this embodiment is calculated as a tuneable percentage ($\beta$) of the total number of local mobile terminals across this station and its neighbours.

$$\min = \beta\left(x + \sum_{i=1}^{m} x_i\right)$$

In a preferred embodiment, once switched off, a station waits for a tuneable amount of time before reassessing its neighbouring situation using the formula described just above. This may result in the base station switching itself back on to serve neighbouring orphan terminals.

Figure 2:
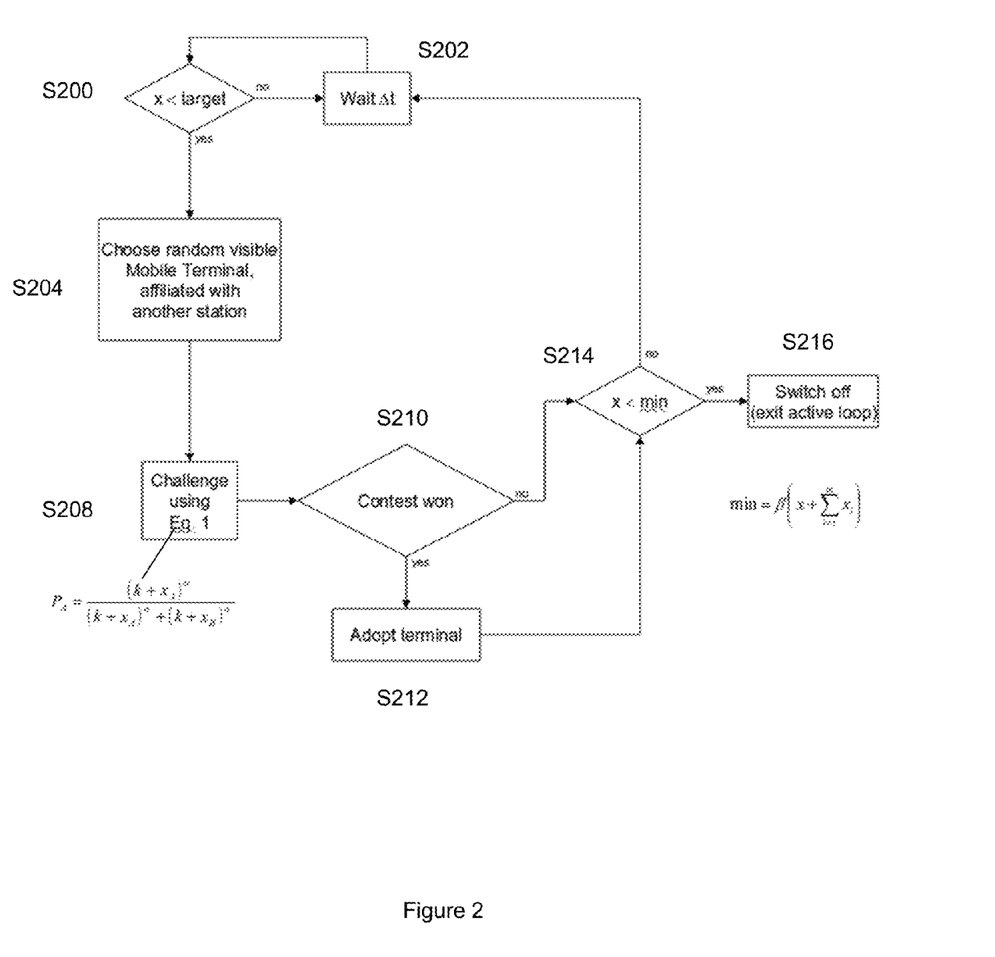
FIG. 2 shows, in schematic form, a method of operating a wireless base-station according to a second embodiment of the present invention.

The process followed by base-stations in a second embodiment of the present invention is set out in FIG. 2. This process is a variation on the embodiment described above. In contrast to the embodiment illustrated in FIG. 1, in this embodiment, the base-stations do not directly look out for other base-stations to compete with, but instead try to identify overlapping mobile terminals that may be stolen, and contact the base-station to which that terminal is affiliated to initiate a contest. Where the operation of the process is the same as that previously described, the description will not be repeated, rather the differences with the above described process will mainly be described.

The steady-state situation is a loop in the upper left-hand corner of FIG. 2 in which the base-station has at least its target number of affiliates. This situation is checked on a regular basis (steps S200, S202).

When the target is not met (S200), the base-station selects a randomly chosen mobile terminal which is visible to the base-station, i.e. within its range, and which is currently not affiliated to the base-station (S204). In this manner the method of this embodiment focuses on a particular terminal which might be swapped between base-stations.

The base-station then challenges the base-station to which the chosen mobile terminal is affiliated (S208). The challenge takes an identical form to that described above.

If the contest is won (S210), the mobile terminal that was the subject of the challenge is adopted by the successful base-station (S212).

As before, if the transfer results in the losing station having less than a set number of affiliates "min" (S214), it switches itself off (S216).

Figure 3:
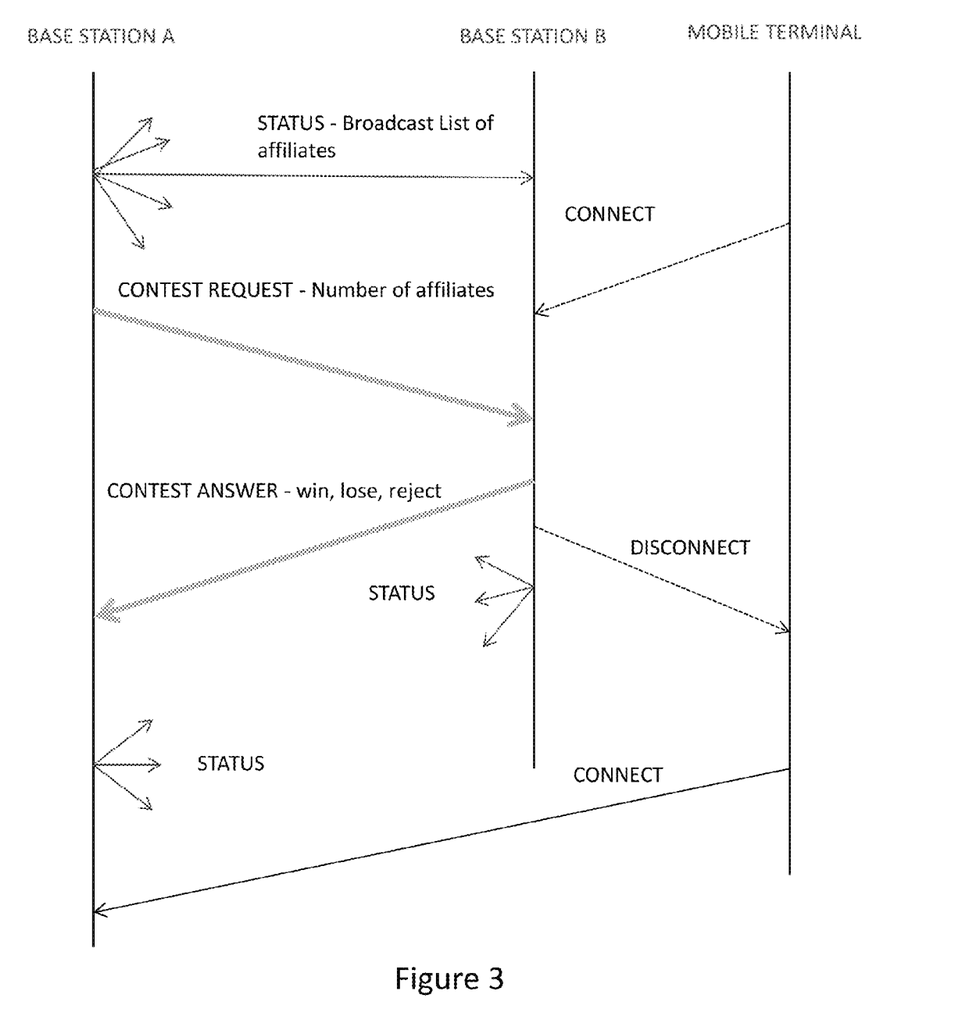
FIG. 3 shows the interactions between two neighbouring base-stations which are embodiments of the present invention.

FIG. 3 illustrates the network level implementation of the above embodiments. Base-stations regularly multicast their list of affiliates to other stations (typically neighbouring base-stations). This enables every base-station to build a local representation of the whole network.

This information could also be obtained in a timely manner through point to point messages between individual base-stations, but multicasting is preferable as it minimises the number of messages handled by each base-station. Such multicasting should not result in scaling issues since stations are only required to maintain information about other base-stations in their immediate vicinity.

Ad-hoc low level networking schemes can thus be implemented to prevent packet flooding. For example, standard UDP multicast mechanisms may be used whereby the packets are sent only once on a local network and the network elements of the server pick up the packets as they arrive. Preferably the network operates so that there is no retransmission of lost packets (as in TCP) and thus no flooding. Since devices need only get information from their neighbors, one can set the TTL (time to live) field of the IP packet to the required number of hops. For example, if neighboring base-stations are typically separated by no more than two IP routers, then the TTL can be set to 2 so that the broadcast messages do not get sent to base-stations which are further away.

Contests (as described above) happen via a standard point to point hand-shake message exchange between two base-stations. This message contains the number of affiliates of the originating base station so that the node "under attack" may evaluate the appropriate formula.

It is advantageous (and assumed in these embodiments) that the network over which the base stations are interconnected is perfect in terms of timing, packet loss, etc. This can be achieved over protocols like TCP.

It is also preferable that the mobile terminals in question do not have any demands or interactions with their base-station. If this is not the case, then additional safeguards may be required in the system in order to ensure that it is possible for a terminal to be transferred from a losing base-station to the successful one. This is not a problem in the GSM context, where the handover mechanism is native.

However, in a wireless internet system, where there is no such native support, to implement the handover, the losing base-station will have to disconnect the mobile terminal in such a way that the latter a) actively reconnects with another station in range rather than reconnecting with the losing base-station and b) ensure that reconnection only occurs with the right winning station. This can be implemented by providing that any base station receiving a connection request must only answer positively if they have just won a contest over this terminal, or if the terminal was not previously known to the system (which includes the neighbouring base-stations). In this embodiment, such information is already available to the base-station through the multicast messages described above.

EXAMPLE

In order to demonstrate quantitatively the effect of applying embodiments of the present invention to various physical configurations of base stations and mobile terminals, a simple simulation study was performed.

This study simulated 100 base stations and a varying number of mobile terminals with contests conducted according to the method described above in relation to FIG. 2. The base-stations were laid out in a hexagonal mesh at a spacing equal to the range of each base-station, while the mobile terminals occupied random positions in space.

Extrapolating these results to the global mobile telephone network, it can be seen that the embodiments of the present invention described above could result in a total saving of up to 4-6 MW in a typical network. ([Louhi et al.]; [Oh et al.] this estimate is based on 40% of a total of at least 10,000 [Gonzalez et al.] base stations in a network to which the invention is applied, with a consumption of 1000 W-1500 W [GMSAa] each.)

This simulation enabled the effect of various parameters on the efficiency of the algorithm to be explored. The efficiency may be measured in terms of one or more of:
i) The number of switched off base stations (Activity);
ii) The number of mobile terminals served by base stations (Coverage);
iii) The number of mobile terminals changing base station as a result of the contests (Swaps);
iv) The time it takes to obtain a stable situation in terms of mobile terminals affiliation (Convergence)

The parameters that were explored were:
a) α in the formula above;
b) k in the formula above;
c) Density of mobile terminals;

d) Capacity of the base-stations;
e) Range of the base-stations;
f) Base-station sleeping time after being switched off;
g) Base-station sleep threshold (number of potential adoptions in the vicinity below which a base-station may switch off)

With a population of 1000 mobile terminals and 100 base-stations and with k=1 and α=3, it was found to be possible to switch off about 40 base stations. Such a reduction would, in practice, result in sizable benefits.

Figure 4:
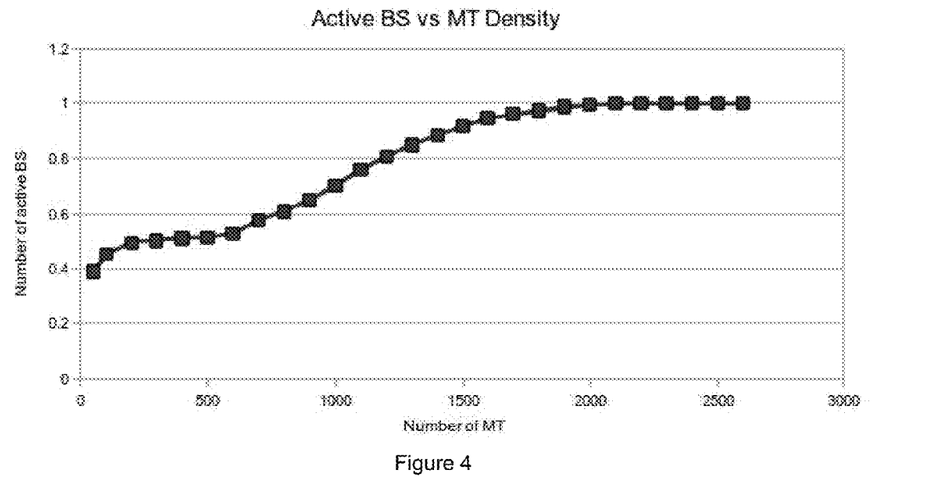
FIG. 4 shows the relationship between the number of mobile terminals and the proportion of active base-stations in a simulation of the operation of a method according to an embodiment of the present invention.

As expected, with all other parameters being equal, the number of active base-stations (BS) varies with the density of mobile terminals as shown in FIG. 4 (the number of active base-stations is plotted as a fraction of the total).

FIG. 4 shows four distinct phases as the number of mobile terminals (MT) increases from left to right:

Firstly, with relatively few mobile phones, the number of ON base stations increases linearly with the number of mobile phones. The reason for this is that there is not enough overlap and base-stations cannot compete. They therefore generally have to switch themselves on as soon as there is one MT in their vicinity.

The second phase is a plateau, where competition starts to take place. The number of BS remains constant, while the number of MTs increases. In this region, the method leads to improvement in efficiency of the system, since it is evident that some BS are indeed switching themselves off.

The third phase is linear again, when some BS have achieved maximum capacity and cannot take more MTs, so that dormant BS need switching back on.

The fourth phase is a plateau again, where all BS run at full capacity and the system is saturated.

The most interesting phase from the point of view of efficiency savings is the first plateau. It is possible to control the extent of this plateau (and therefore the operating conditions over which the savings can be achieved) by varying the base-stations' capacity as shown in the FIG. 5.

Figure 5:
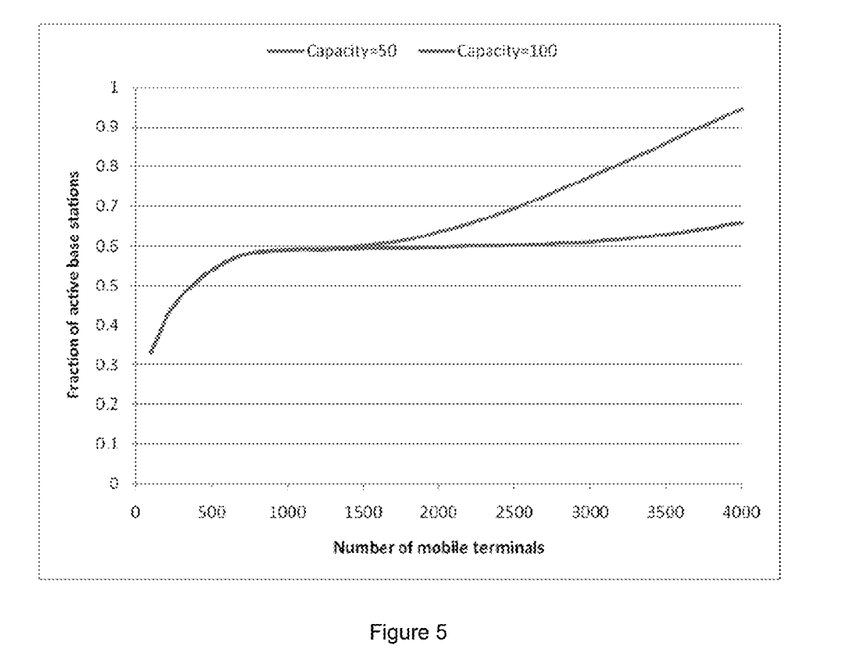
FIG. 5 shows the effect of changing the capacity of each base-station in a simulation of the operation of a method according to an embodiment of the present invention.

By doubling the capacity of each base-station, the plateau region can be extended from between approximately 500-1500 mobile terminals up to 3000 mobile terminals.

Figure 6:
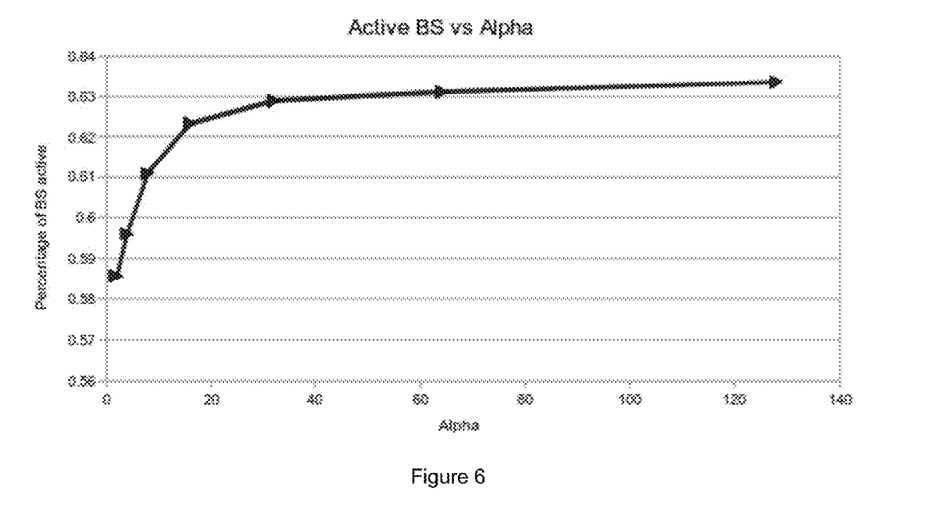
FIG. 6 shows the effect of changing a parameter in a simulation of the operation of a method according to an embodiment of the present invention on the number of active base-stations.
Figure 7:
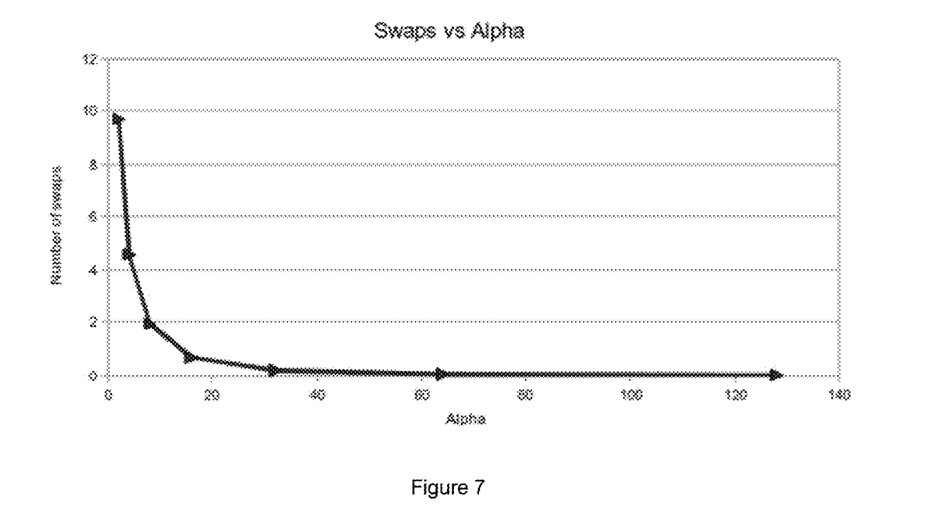
FIG. 7 shows the effect of changing a parameter in a simulation of the operation of a method according to an embodiment of the present invention on the number of swaps taken to reach a steady state.

Next, the extent to which the efficiency of the algorithm is impacted by choices of k and α was investigated, starting from the set up described previously. FIGS. 6 and 7 demonstrate that the effects of changing α are, for a wide range of possibilities, not noticeable (the number of mobile terminals and base stations being kept constant). This suggests that the algorithm is robust and will perform well in real life scenarios (i.e. it will not be unduly affected by unforeseen conditions).

However, it should be noted that low values of alpha (less than 3) result in slightly lower numbers of base stations switched on (3 or 4), which can be explained by the fact that the system gets more time to settle down, in a similar fashion to simulated annealing.

Conversely and equally understandably, higher values of alpha (more than 10) result in significantly fewer mobile terminal swaps before a steady state is reached (with no movement of terminals being accounted for). Since swaps are likely to have an associated energy cost on the terminals, an optimum value for alpha can be chosen for each individual implementations, depending on their specifics and whether the gains from an overall slight efficiency gain in terms of the steady state situation (FIG. 6) outweigh the costs of more swaps taking place to achieve that (FIG. 7).

The methods and systems described in the above embodiments are preferably combined and used in conjunction with each other.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

The present inventors have also realised that the approach described above is reflected in nature. In some termite species, a characteristic early phase in nest construction involves the building of more or less evenly spaced "pillars". How workers effectively "choose" where to start building these pillars so as to achieve this approximately regular distribution in the absence of any blueprint has long been a mystery. In the late 1970's, a workable explanation was provided by Jean Louis Deneubourg [Deneubourg], who proposed that termites are actually simply acting as catalysts in what strongly resembles pattern formation in a chemical reaction.

Basically, through a process known as "stigmergy", social insect workers are driven to amplify small heterogeneities in their environment. Although this can be a complex process involving both mechanical stimuli and chemical communication (pheromones), the basic effect in the termite nest example is that building material tends to "pile-up" in regions which, due to random noise, had a "head-start" (positive feedback).

However, because building material and workers are in finite supply, nearby accumulation sites (pillar bases) effectively compete with each other, making it highly improbable that two pillars start to grow significantly if they're in close proximity. Conversely, it is very likely that an area located far enough from any other accumulation site (i.e. outside any "basin of attraction") will eventually see the emergence of a pillar, even if it lacks strong heterogeneities in the initial conditions. The combination of these two effects (competition between close neighbours and statistically limited attraction range) is enough to result in an almost regular structure.

This similarity ("pillars"="base-stations"; "resources"="mobile terminals") provides further validation of the methods and systems set out in the above embodiments of the present invention.

REFERENCES

[Deneubourg] Jean Louis Deneubourg. "Application de l'ordre par fluctuations a la description de certaines etapes de la construction de nid chez les termites", Insectes Sociaux, Paris, 1977, Tome 24, pages 117-130.
[GMSAa] GSM Association, "GSMA—European Mobile Manifesto"November 2009.
[GMSAb] GSM Association, "GSMA—Mobiles Green Manifesto"November 2009.
[Gong et al.] Jie Gong, Sheng Zhou, Zhisheng Niu, and Peng Yang. "Traffic-aware base station sleeping in dense cellular networks". In 18th International Workshop on Quality of Service (IWQoS), pages 1-2, Beijing, June 2010. ISSN: 1548-615X, Print ISBN: 978-1-4244-5987-2.
[Gonzalez et al.] Marta C. Gonzalez, Cesar A. Hidalgo, and Albert-Laszlo Barabasi. "Understanding individual human mobility patterns". Nature, 453(5):779-782, June 2008.
[Louhi et al.] Jyrki T. Louhi. "Energy efficiency of modern cellular base stations". In 29th International Telecommunications Energy Conference. INTELEC, pages 475-476, 2007.
[Marsan et al.] Marco Ajmone Marsan, Luca Chiaraviglio, Delia Ciullo, and Michela Meo. "Optimal Energy Savings in Cellular Access Networks". In IEEE International Conference on Communications Workshops, 2009. ICC Workshops 2009, pages 1-5, Dresden, June 2009. Print ISBN: 978-1-4244-3437-4.
[Oh et al.] Eunsung Oh and Bhaskar Krishnamachari. "Energy savings through dynamic base station switching in cellular wireless access networks". In IEEE Global Communications Conference. GLOBECOM, Florida, December 2010.
[Riaz et al.] M. Tahir Riaz, Jose M. Gutierrez, and Jens M. Pedersen. "Strategies for the next generation green ict infrastructure". In 2nd International Symposium on Applied Sciences in Biomedical and Communication Technologies. ISABEL, pages 1-3, Bratislava, November 2009. Print ISBN: 978-1-4244-4640-7
[Robson] John E. Robson "Airline Deregulation—Twenty Years of success and counting."
[Zhou et al.] Sheng Zhou, Jie Gong, Zexi Yang, Zhisheng Niu, and Peng Yang. "Green Mobile Access Network with Dynamic Base Station Energy Saving". In Mobicom 2009, September 2009.

All references referred to above are hereby incorporated by reference.

The invention claimed is:

1. A method of allocating clients to a first server, the method including the steps of:
a) determining, as between said first server and a second server, a contest which is weighted in favour of the server with the greater number of allocated clients, wherein the contest is determined by the formula:

$$P_A = \frac{(k+x_A)^\alpha}{(k+x_A)^\alpha + (k+x_S)^\alpha}$$

where $P_A$ is the probability of server A winning the contest, $x_S$ is the number of clients affiliated to server S, and k and α are tunable parameters; and
b) if said first server is successful in said contest, changing the allocation of a client from said second server to said first server, and further including the step of:
c) if the number of clients allocated to any server falls below a first threshold level, powering down said server.

2. The method according to claim 1 wherein said steps a) and b) are repeated.

3. The method according to claim 1 further including the step of, prior to said step of determining, identifying the potential for switching the allocation of a client from said second server to said first server.

4. The method according to claim 3 wherein said step of identifying includes the sub-steps of:
identifying said second server as a neighbouring server which may have a client which could be allocated to said first server; and
determining whether said second server currently has any allocated clients which could be allocated to said first server.

5. The method according to claim 3 wherein said step of identifying includes the sub-step of:
identifying a client which is able to be allocated to said first server, but is currently allocated to said second server.

6. The method according to claim 1 wherein the method further includes the steps of:
d) determining whether the number of clients allocated to the first server is at or above a second threshold level; and
e) if said number of clients is below said second threshold level, performing steps a) to c) above.

7. The method according to claim 6 wherein if said number of clients is at or above said second threshold level, re-performing steps d) and e) after a predetermined time interval.

8. The method according to claim 1, further including the steps of, for a powered down server:
checking whether the number of unallocated clients within range of said server is at or above said first threshold level; and
if said number is at or above said first threshold level, powering up said server and allocating said unallocated clients to said server.

9. The method according to claim 1 wherein said first threshold varies with time.

10. The method according to claim 1 wherein said first threshold varies between servers.

11. The method according to claim 1 wherein the servers are mobile telephone network base-stations and the clients are mobile telephone handsets.

12. The method according to claim 1 wherein the servers are computer servers and the clients are client computers running programs which interact with said servers.

13. A server for supplying a service to a plurality of clients, the server having a control unit, wherein said control unit is arranged to:
manage the allocation of clients to said server by:
a) determining, as between the server and a second server, a contest which is weighted in favour of the server with the greater number of allocated clients, wherein the contest between servers is determined by the formula:

$$P_A = \frac{(k+x_A)^\alpha}{(k+x_A)^\alpha + (k+x_S)^\alpha}$$

where $P_A$ is the probability of server A winning the contest, $x_S$ is the number of clients affiliated to server S, and k and $\alpha$ are tunable parameters;
- b) if said server is successful in said contest, changing the allocation of a client from said second server to said server;
- c) following a contest with another server, determining the number of clients allocated to said server; and
- d) if said determined number of clients fails below a first threshold level, powering down said server.

14. The server according to claim 13, wherein said control unit is further arranged to manage the allocation of clients by identifying the potential for switching the allocation of a client from a second server to said server.

15. The server according to claim 14 wherein the control unit is arranged to identify said potential by:
    identifying said second server as a neighbouring server which may have a client which could be allocated to said first server; and
    determining whether said second server currently has any allocated clients which could be allocated to said first server.

16. The server according to claim 14 wherein the control unit is arranged to identify said potential in a) above by:
    identifying a client which is able to be allocated to said first server, but is currently allocated to said second server.

17. The server according to claim 13 wherein the server periodically broadcasts, to one or more neighbouring servers, a list of the clients which are currently allocated to the server.

18. The server according to claim 13 wherein the control unit is further arranged to:
    determine whether the number of clients allocated to the first server is at or above a second threshold level; and
    if said number of clients is below said second threshold level, perform steps a) to d) above.

19. The server according to claim 13 wherein the control unit is further arranged to, if the server is currently powered down:
    check whether the number of unallocated clients within range of said server is at or above said first threshold level; and
    if said number is at or above said first threshold level, power up said server and allocate said unallocated clients to said server.

20. A system having a plurality of servers connected by a communications network, each of said servers supplying a service to one or more clients, and each of said servers having a control unit, wherein said control units are arranged to: manage the allocation of clients to the servers by:
    a) determining, as between a first and a second server, a contest which is weighted in favour of the server with the greater number of allocated clients, wherein the contest between servers is determined by the formula:

$$P_A = \frac{(k+x_A)^\alpha}{(k+x_A)^\alpha + (k+x_S)^\alpha}$$

where $P_A$ is the probability of server A winning the contest, $x_S$ is the number of clients affiliated to server S, and k and $\alpha$ are tunable parameters; and
- b) if said second server is successful in said contest, changing the allocation of a client from said first server to said second server;
- c) following a contest with another server, determining the number of clients allocated to each server; and
- d) if said determined number of clients falls below a first threshold level, powering down said server.

21. The system according to claim 20 wherein said control units are further arranged to identify the potential for switching the allocation of a client from a first server to a second server.

22. The system according claim 21 wherein:
    said step a) of identifying is performed by the control unit of the second server; and
    said step b) of determining is perfomed by the control unit of the first server.

23. The system according to claim 20 wherein said servers periodically broadcast, to one or more neighbouring servers, a list of the clients which are currently allocated to the server.

24. The system according to claim 20 further including one or more of said mobile clients.

25. A mobile telecommunications system having:
    a plurality of base-stations for supplying a mobile telecommunications network to one or more mobile telephone handsets, each of said handsets being either allocated to one of said base-stations or being unallocated; and
    a communications network connecting said base-stations, wherein each of said base-stations has a control unit, said control units being arranged to manage the allocation of said mobile handsets to the base-stations by:
    a) identifying the potential for switching the allocation of a handset from a first base-station to a second base-station;
    b) determining, as between the first and second base-stations, a contest which is weighted in favour of the base-station with the greater number of allocated handsets wherein the contest between servers is determined by the formula:

$$P_A = \frac{(k+x_A)^\alpha}{(k+x_A)^\alpha + (k+x_S)^\alpha}$$

where $P_A$ is the probability of server A winning the contest $x_S$ is the number of clients affiliated to server S, and k and $\alpha$ are tunable parameters; and
- c) if said second base-station is successful in said contest, changing the allocation of said handset from said first base-station to said second base-station;
- d) following a contest with another base-station, determining the number of handsets allocated to each base-station; and
- e) if said determined number of handsets falls below a first threshold level, disabling said base-station.

26. A computer network having:
    a plurality of client computers;
    a plurality of server computers for supplying services to one or more of said client computers, each of said client computers being either allocated to one of said server computers; and
    a communications network connecting said server computers and said client computers,
    wherein each of said server computers has a control unit, said control units being arranged to manage the allocation of said client computers to the server computers by:

a) identifying the potential for switching the allocation of a client computer from a first server computers to a second server computer;
b) determining, as between the first and second server computers, a contest which is weighted in favour of the server computer with the greater number of allocated client computers wherein the contest between servers is determined by the formula:

$$P_A = \frac{(k+x_A)^\alpha}{(k+x_A)^\alpha + (k+x_S)^\alpha}$$

where $P_A$ is the probability of server A winning the contest, $x_S$ is the number of clients affiliated to server S, and k and $\alpha$ are tunable parameters; and
c) if said second server computer successful in said contest, changing the allocation of said client computer from said first server computer to said second server computer;
d) following a contest with another server computer, determining the number of client computers allocated to each server computer; and
e) if said determined number of client computers falls below a first threshold level, disabling said server computer.

* * * * *